United States Patent
Inoue et al.

(10) Patent No.: US 11,569,611 B2
(45) Date of Patent: Jan. 31, 2023

(54) CONNECTOR ASSEMBLY WITH AN INTERMEDIATE INSULATING MEMBER AND A POTTING MATERIAL THAT FILLS A PORTION IN AN OUTER CONDUCTOR MORE ON THE FRONT SIDE THAN ON THE FRONT SURFACE OF THE INTERMEDIATE INSULATING MEMBER

(71) Applicant: Molex, LLC, Lisle, IL (US)

(72) Inventors: Naoya Inoue, Yamato (JP); Taichi Taniguchi, Yamato (JP); Masato Okano, Yamato (JP)

(73) Assignee: Molex, LLC, Lisle, IL (US)

( * ) Notice: Subject to any disclaimer, the term of this patent is extended or adjusted under 35 U.S.C. 154(b) by 521 days.

(21) Appl. No.: 16/619,084

(22) PCT Filed: May 17, 2018

(86) PCT No.: PCT/US2018/033230
§ 371 (c)(1),
(2) Date: Dec. 4, 2019

(87) PCT Pub. No.: WO2018/226381
PCT Pub. Date: Dec. 13, 2018

(65) Prior Publication Data
US 2020/0099168 A1    Mar. 26, 2020

(30) Foreign Application Priority Data

Jun. 9, 2017 (JP) .............................. JP2017-114510

(51) Int. Cl.
*H01R 13/627* (2006.01)
*H01R 13/26* (2006.01)
(Continued)

(52) U.S. Cl.
CPC ......... *H01R 13/6271* (2013.01); *H01R 13/26* (2013.01); *H01R 13/42* (2013.01);
(Continued)

(58) Field of Classification Search
CPC .... H01R 13/6271; H01R 13/26; H01R 13/42; H01R 13/521; H01R 13/5216; H04N 5/2251
(Continued)

(56) References Cited

U.S. PATENT DOCUMENTS 8,801,459 B2 * 8/2014 Mrowka ................ H01R 24/50
439/246
8,888,519 B2 * 11/2014 Baumler .............. H01R 24/542
439/248
(Continued)

FOREIGN PATENT DOCUMENTS

CN    201515126 U    6/2010
CN    201682140 U    12/2010
(Continued)

OTHER PUBLICATIONS

Office Action received for CN Application No. 201880037623.2, dated Apr. 29, 2021, 12 Pages (7 Pages of English Translation and 5 Pages of Official notification).
(Continued)

*Primary Examiner* — Peter G Leigh

(57) ABSTRACT

A configuration ensuring a connector to be fixed to a connector housing with high water-tightness, free of damaging or breaking due to external force, and achieving high shielding performance and reliability is provided. The connector includes a terminal that is conductive, an intermediate insulating member that contains the terminal, and an outer conductor that is conductive and contains the intermediate insulating member. The connector housing includes an outer
(Continued)

conductor holding part provided with an outer conductor insertion hole through which the outer conductor is inserted and a front outer conductor containing cavity that is formed on a front side of the outer conductor holding part and has a larger cross-sectional area than the outer conductor insertion hole. The connector is fixed to the connector housing with a tab welded to a front surface of the outer conductor holding part, the tab being integrally formed with the outer conductor, and with a potting material filled in a portion in the front outer conductor containing cavity close to the front surface of the outer conductor holding part.

9 Claims, 10 Drawing Sheets

(51) Int. Cl.
    *H01R 13/42*     (2006.01)
    *H01R 13/52*     (2006.01)
    *H04N 5/225*     (2006.01)

(52) U.S. Cl.
    CPC ....... *H01R 13/521* (2013.01); *H01R 13/5216* (2013.01); *H04N 5/2251* (2013.01)

(58) Field of Classification Search
    USPC ........................................................ 439/588
    See application file for complete search history.

(56) References Cited

U.S. PATENT DOCUMENTS

| | | | | |
|---|---|---|---|---|
| 9,190,786 B1 * | 11/2015 | Baumler | ............... | H01R 13/514 |
| 9,325,095 B2 * | 4/2016 | Glick | ................... | H01R 13/187 |
| 2002/0061670 A1 | 5/2002 | Havener et al. | | |
| 2013/0017739 A1 | 1/2013 | Glick et al. | | |
| 2014/0329399 A1 * | 11/2014 | Ohsumi | ............. | H01R 13/5202 439/276 |
| 2016/0190721 A1 | 6/2016 | Regantini et al. | | |

FOREIGN PATENT DOCUMENTS

| | | | | |
|---|---|---|---|---|
| CN | 102326299 A | 1/2012 | | |
| CN | 205355467 U | 6/2016 | | |
| CN | 102842791 B | 8/2016 | | |
| CN | 205429282 U | 8/2016 | | |
| DE | 20118955 U1 * | 1/2002 | ......... | H01R 13/6315 |
| JP | 2002-367738 A | 12/2002 | | |
| JP | 2009290527 A | 12/2009 | | |
| JP | 2010015930 A | 1/2010 | | |
| JP | 2015026568 A | 2/2015 | | |
| JP | 2015-170515 A | 9/2015 | | |
| JP | 6039541 B2 | 12/2016 | | |
| WO | WO-2011088902 A1 * | 7/2011 | ............. | H01R 24/50 |
| WO | WO-2013181146 A1 * | 12/2013 | ........... | H01R 13/111 |
| WO | 2018/226381 A1 | 12/2018 | | |

OTHER PUBLICATIONS

International Search report and written opinion received for PCT application No. PCT/US2018/033230, dated Sep. 14, 2018, 7 pages.
International preliminary report on Patentability received for PCT application No. PCT/US2018/033230, dated Dec. 19, 2019, 6 pages.
Decision to Grant received for JP Application No. 2017-114510, dated Jan. 5, 2021, 5 Pages.(2 Pages of English Translation and 3 Pages of Official notification).

* cited by examiner

CONNECTOR ASSEMBLY WITH AN INTERMEDIATE INSULATING MEMBER AND A POTTING MATERIAL THAT FILLS A PORTION IN AN OUTER CONDUCTOR MORE ON THE FRONT SIDE THAN ON THE FRONT SURFACE OF THE INTERMEDIATE INSULATING MEMBER

RELATED APPLICATIONS

This application is a national phase of PCT Application No. PCT/US18/33230, filed on May 17, 2018, which claims priority to Japanese Application No. 2017-114510, filed Jun. 9, 2017, which are is incorporated herein by reference in their entirety.

TECHNICAL FIELD

The present disclosure relates to a connector assembly.

BACKGROUND ART

In the related art, connectors such as a cable connector have been used to connect a power line such as a coaxial cable to a module including a sensor module including a light reception sensor such as an infrared sensor, a camera module in which an image sensor such as a charge coupled device (CCD) or a complementary metal oxide semiconductor (CMOS) image sensor and an optical element such as a lens are integrated, and an acoustic element module such as a microphone (see, for example, Patent Document 1).

FIG. 10 is a cross-sectional of a known connector.

In the figure, 871 denotes a housing, made of insulating resin, for a connector connected to a distal end of an unillustrated coaxial cable. The housing has a substantially cylindrical main body with a front end provided with a flange coupled with a casing 911 of a module. An outer conductor 861 having a substantially cylindrical shape is held in the housing 871. An inner conductor 851 having a rod shape is held in the outer conductor 861 via a dielectric body 811. The outer conductor 861 and the inner conductor 851 are held at a front end of the main body of the housing 871 with a potting material 818 made of waterproof silicone resin.

The module is a camera module having a lens 941 held by the casing 911. A first circuit board 931 and a second circuit board 932 surrounded by a cylindrical shielding member 971 are held in the casing 911. An image sensor 942 that converts light received from the lens 941 into an electrical signal is mounted on the first circuit board 931. The second circuit board 932 has a surface on which a contact part is formed. Distal ends of the outer conductor 861 and the inner conductor 851 of the connector are connected to the contact part via a relay terminal 951. The casing 911 has a back end coupled to the flange of the housing 871 of the connector in a waterproof manner via a sealing packing 912.

Patent Document 1: JP 2015-170515 A

SUMMARY

Generally, the known connector has the housing 871 made of resin to be easily manufactured. On the other hand, the casing 911 may be made of metal to achieve higher strength, higher shielding performance, and the like of the module. In such a case, when the housing 871 made of resin is coupled to the casing 911, a conductive member needs to be additionally prepared to establish conduction between the casing 911 and a ground line or the like.

Thus, an object herein is to solve the problems in the related art and provide a connector assembly ensuring a connector to be fixed to a connector housing with high water-tightness, free of damaging or breaking due to external force, and achieving high shielding performance and reliability.

In view of the above, a connector assembly includes a connector and a connector housing to which the connector is attached. The connector includes a terminal that is conductive, an intermediate insulating member that contains the terminal, and an outer conductor that is conductive and contains the intermediate insulating member. The back housing includes an outer conductor holding part provided with an outer conductor insertion hole through which the outer conductor is inserted and a front outer conductor containing cavity that is formed on a front side of the outer conductor holding part and has a larger cross-sectional area than the outer conductor insertion hole. The connector is fixed to the connector housing with a tab welded to a front surface of the outer conductor holding part, the tab being integrally formed with the outer conductor, and with a potting material filled in a portion in the front outer conductor containing cavity close to the front surface of the outer conductor holding part.

In another configuration of the connector assembly, the outer conductor includes a plurality of slits formed in a portion more on a front side than the front surface of the outer conductor holding part, and pieces of the potting material filled in portions on inner and outer sides of the outer conductor are connected to each other through the slits.

In still another configuration of the connector assembly, the intermediate insulating member has a front surface positioned more on a back side than the tab, and the potting material further fills a portion in the outer conductor more on the front side than the front surface of the intermediate insulating member.

In yet still another configuration of the connector assembly, the outer conductor is provided with a recess part that functions as a reservoir part for the potting material.

In yet still another configuration of the connector assembly, an anchor part, with which the potting material is engaged, is formed in a portion of the terminal more on the front side than the front surface of the intermediate insulating member.

In yet still another configuration of the connector assembly, the outer conductor is a substantially cylindrical member made of a curved plate.

The connector assembly according to the present disclosure ensures the connector to be fixed to the connector housing with high water-tightness, is free of damaging or breaking due to external force, and achieves high shielding performance and reliability.

BRIEF DESCRIPTION OF THE DRAWINGS

FIG. 1A is a back view of the connector and FIG. 1B is a front view of the connector.

FIG. 2A is a back view of the connector and FIG. 2B is a front view of the connector.

FIG. 4A is a back view of the outer conductor and FIG. 4B is a front view of the outer conductor.

FIG. 5A is a side view of the outer conductor, FIG. 5B is a side view of the outer conductor rotated by 45° in one direction about a center axis, FIG. 5C is a side view of the outer conductor rotated by 45 in the other direction about the center axis, FIG. 5D is a front view of the outer conductor as illustrated in FIG. 5C, FIG. 5E is a back view of the outer conductor as illustrated in FIG. 5C, and FIG. 5F is a side cross-sectional view of the outer conductor as illustrated in FIG. 5C.

FIG. 6A is a side view of the inner conductor and the intermediate insulating member, FIG. 6B is a front view of the inner conductor and the intermediate insulating member as illustrated in FIG. 6A, FIG. 6C is a back view of the inner conductor and the intermediate insulating member as illustrated in FIG. 6A, and FIG. 6D is a side view of the inner conductor and the intermediate insulating member, as illustrated in FIG. 6A, rotated by 90° in one direction about the center axis.

FIG. 7A is a side cross-sectional view of the inner conductor, the intermediate insulating member, and the outer conductor and FIG. 7B is a side view of the inner conductor, the intermediate insulating member, and the outer conductor, as illustrated in FIG. 7A, rotated by 90° in one direction about the center axis.

FIG. 8A is a side cross-sectional view of the connector and the back housing and FIG. 8B is a side view of the connector and the back housing, as illustrated in FIG. 8A, rotated by 90° in one direction about the center axis.

FIG. 9A is a cross-sectional view illustrating a state where the substrate is attached to the back housing as illustrated in FIG. 8B and FIG. 9B is a cross-sectional view illustrating a state where the casing is further attached.

DETAILED DESCRIPTION OF THE PREFERRED EMBODIMENTS

Embodiments will be described in detail below with reference to the drawings.

Figure 1B:
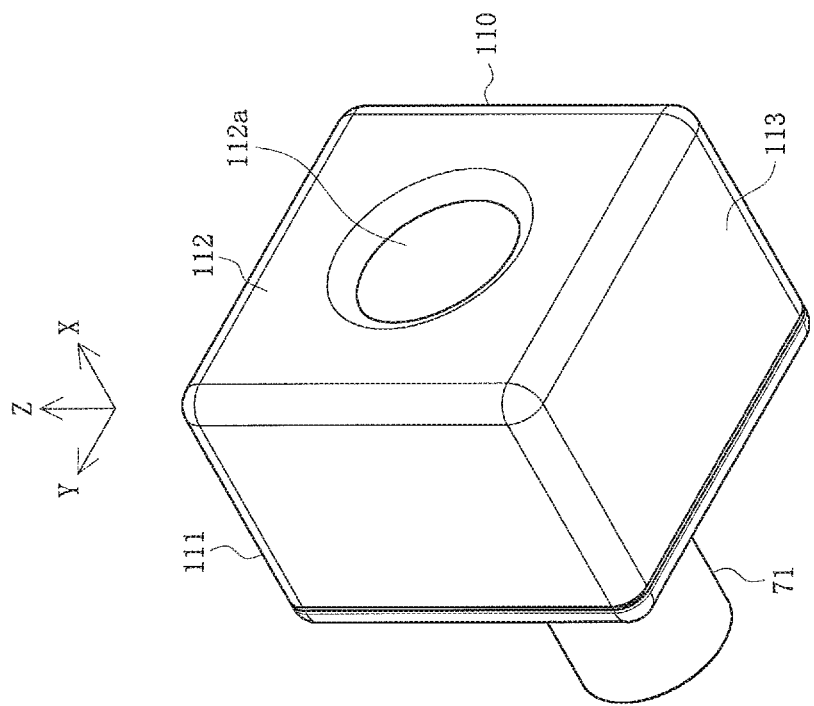
FIGS. 1A and 1B are perspective views illustrating a state where a connection target member is connected to a connector according to the present embodiment.
Figure 1A:
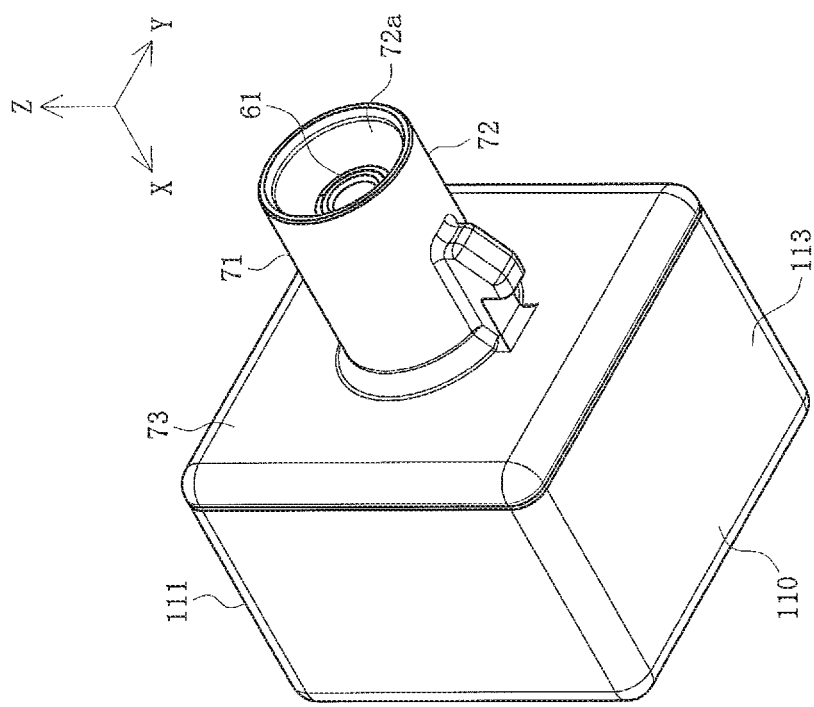
Figure 2A:
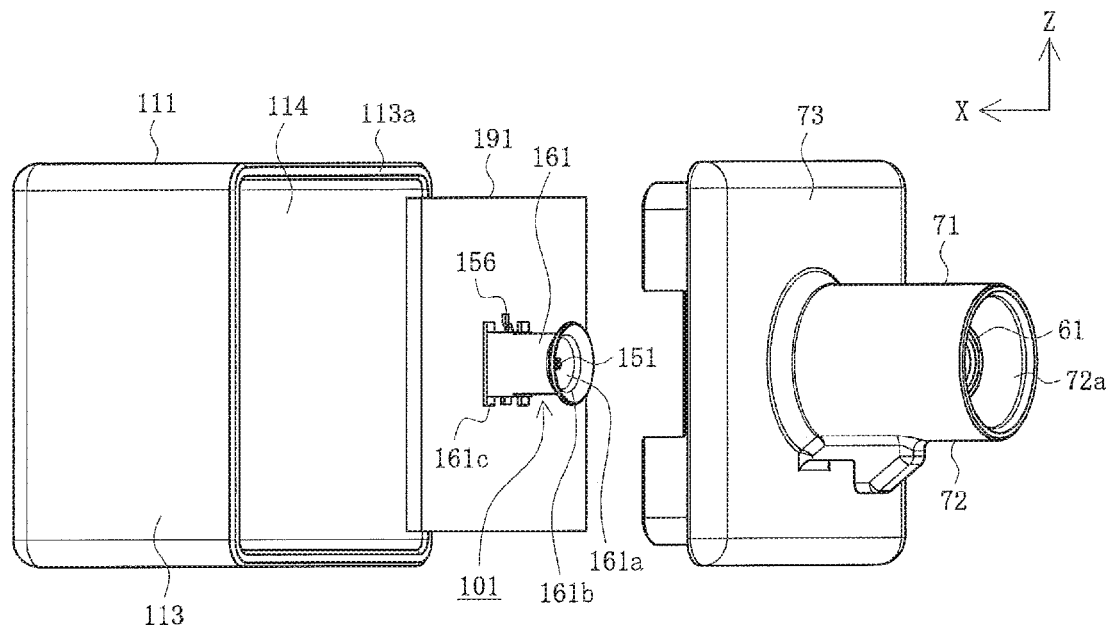
FIGS. 2A and 2B are exploded views illustrating the connector and the connection target member according to the present embodiment in an unassembled state.
Figure 2B:
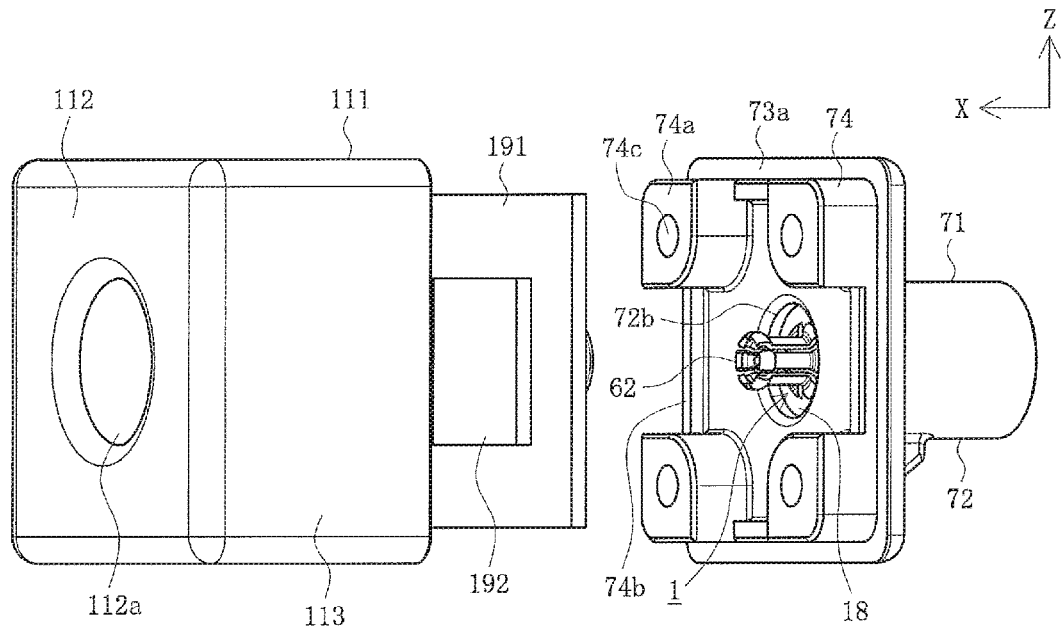
Figure 3:
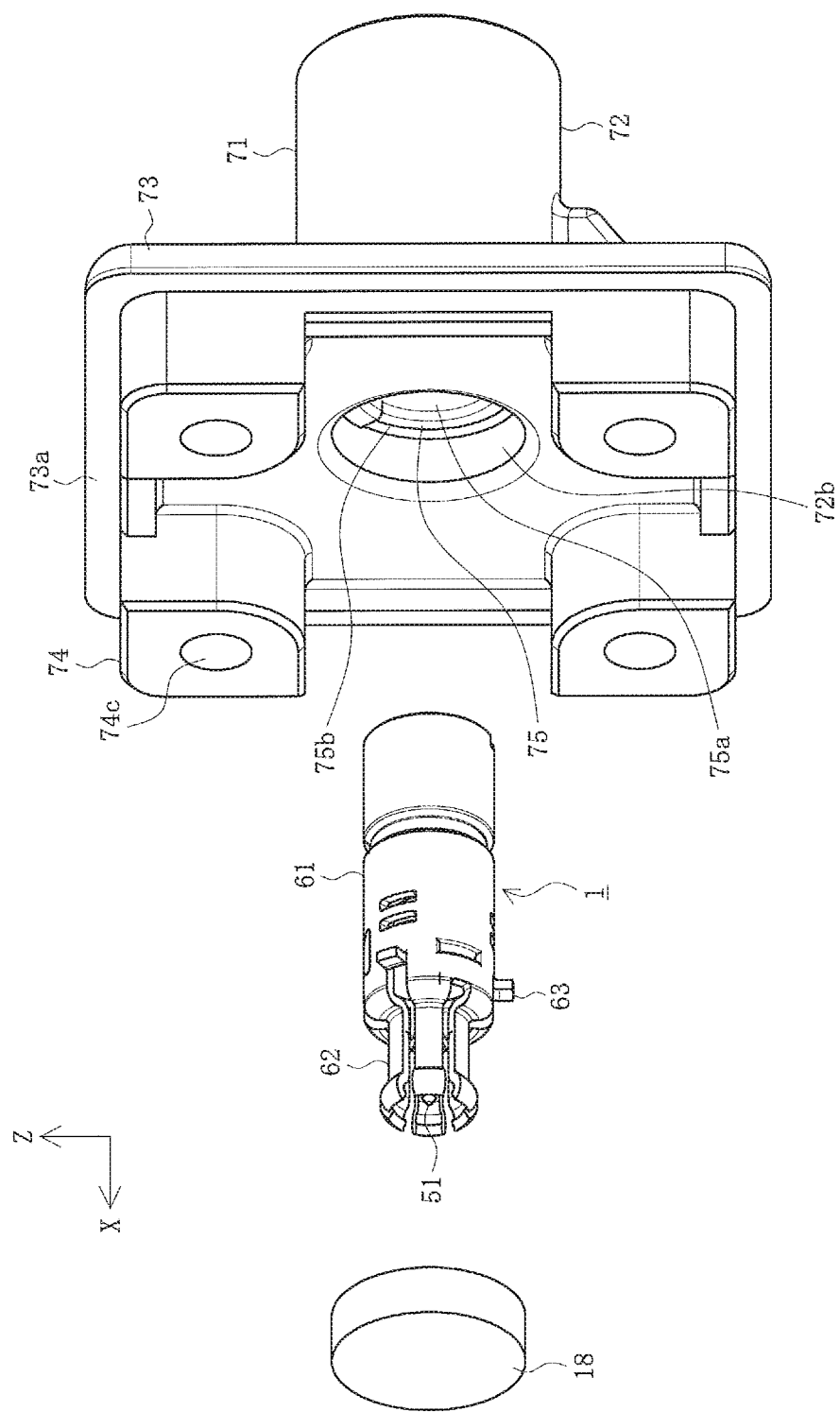
FIG. 3 is an exploded view of the connector according to the present embodiment.

FIGS. 1A and 1B are perspective views illustrating a state where a connection target member is connected to a connector according to the present embodiment. FIGS. 2A and 2B are exploded views illustrating the connector and the connection target member according to the present embodiment in an unassembled state. FIG. 3 is an exploded view of the connector according to the present embodiment. FIGS. 1A and 2A are back views of the connector and FIGS. 1B and 2B are front views of the connector.

In the figures, 1 denotes a connector that is a cable connector according to the present embodiment, and is used while being connected to a distal end of a cable such as a signal cable that is not illustrated. In this description, a waterproof coaxial connector, supporting the FAKRA standard, connected to a distal end of a cable is assumed to be connected to a back side of the connector 1 (negative X axis direction), for the sake of description.

A module 110, serving as a connection target member, is connected to a front side of the connector 1 (positive X axis direction). For example, the module 110 is a camera module including an image sensor such as a CCD or a CMOS image sensor and an optical element such as a lens that are integrated. Note that any other types of module may be employed. Specifically, a sensor module including a light reception sensor such as an infrared sensor, an acoustic element module such as a microphone, or the like may be employed. For example, the connector 1 may be used for mounting the module 110 to a device such as an automobile or any other devices including an electronic device such as a mobile phone, a personal digital assistant (PDA) computer, a game console, or a digital camera, and a device such as a security monitoring device.

Note that expressions for indicating directions such as up, down, left, right, front, and back, used to describe the operations and configurations of the parts of the connector 1 and the module 110 in the present embodiment are not absolute but rather relative directions, and though appropriate when the parts of the connector 1 and the module 110 are in the positions illustrated in the figures, these directions should be interpreted differently when these positions change, in order to correspond to said change.

The module 110 includes a casing 111 that is integrally formed of a conductive metal such as aluminum alloy, a substrate 191 such as a printed circuit board disposed in the casing 111, an element 192 such as an image sensor that is mounted on a surface of the substrate, and a module side connector 101, serving as a mating connector, mounted on a back side surface of the substrate 191. The casing 111 is a member having a substantially rectangular parallelepiped box shape and including a front plate 112 having a substantially rectangular plate shape, four side plates 113 having a plate shape, connected to four sides of the front plate 112, and extending in a front and back direction (X axis direction), and a module inner space 114 having the circumference defined by the front plate 112 and the side plates 113 and having the back side open. The substrate 191 is contained in the module inner space 114. The front plate 112 has an opening 112a formed at the center. Light entering from the outside through the opening 112a is received by the element 192 disposed in the module inner space 114. Preferably, the opening 112a is provided with a lens or a screen made of a transparent material so that foreign objects such as water and dust can be prevented from entering the module inner space 114 from the outside.

The module side connector 101 includes a mating side inner conducting member 151 and a mating side outer conducting member 161. The mating side inner conducting member 151 is made of a conductive metal such as copper alloy, and stands on a back side surface of the substrate 191 to protrude toward the back side. The mating side outer conducting member 161 is made of a conductive metal such as copper alloy, is formed to have a cylindrical shape surrounding the circumference of the mating side inner conducting member 151, and stands on the back side surface of the substrate 191 to protrude toward the back side. The mating side outer conducting member 161 has an inner space serving as a mating side fitting space 161*a* into which a contact arm 62 of an outer conductor 61 of the connector 1 fits to be in contact. The mating side outer conducting member 161 has a tapered portion 161*b*, with a width increasing outward, formed at a back end (end in the negative X axis direction) so that the contact arm 62 can smoothly enter the mating side fitting space 161*a*. The mating side outer conducting member 161 has a length of approximately 4.0 mm in the front and back direction. The mating side fitting space 161*a* has an inner diameter of approximately 2.5 mm. Note that these sizes can be changed as appropriate.

The mating side outer conducting member 161 has a plurality of attachment pieces 161*c* at the front end (end in the positive X axis direction). The attachment pieces 161*c* are electrically and mechanically connected to a connection pad (not illustrated) formed on the back surface of the substrate 191 by soldering or the like. In FIG. 2A, 156 denotes a tail part of the mating side inner conducting member 151. The tail part 156 protrudes outward from the front end of the mating side outer conducting member 161 while being electrically insulated from the mating side outer conducting member 161, and is electrically and mechanically connected to a connection pad (not illustrated) formed on the back surface of the substrate 191 by soldering or the like.

As illustrated in FIG. 3, the connector 1 is made of a conductive metal such as copper alloy, and includes an inner conductor 51 and the outer conductor 61. The inner conductor 51 is an elongated rod shaped terminal that is made of a conductive metal such as copper alloy and extends in the front and back direction. The outer conductor 61 is made of a conductive metal such as copper alloy, is formed to have a substantially cylindrical shape surrounding the circumference of the inner conductor 51, and extends in the front and back direction. The connector 1 is what is known as a bullet connector having a substantially bullet shape as a whole, and is connected to a back housing 71 serving as a connector housing, integrally formed of a conductive metal such as aluminum alloy, so that a connector assembly is formed. The outer conductor 61 has a length of approximately 12.0 mm in the front and back direction and has an outer diameter of approximately 3.7 mm. Note that these sizes can be changed as appropriate.

A back housing 71 includes a substantially cylindrical main body part 72 and a flange part 73 having a substantially rectangular flat plate shape integrally connected to a front end (end in the positive X axis direction) of the main body part 72. The flange part 73 also functions as a lid member closing the back side of the module inner space 114 of the module 110. Positioning protrusions 74 protruding toward the front side are formed on the four corners of the front surface of the flange part 73. Adjacent ones of the positioning protrusions 74 are connected to each other via connection protruding walls 74*b* protruding toward the front side from the front surface of the flange part 73. The connection protruding walls 74*b* and the positioning protrusions 74 have outer surfaces flush with each other, to seal gaps between the flange part 73 and the casing 111 in a watertight manner as illustrated in FIGS. 1A and 1B. In a state where the flange part 73 is attached to the casing 111, a front end circumference surface 73*a* of the flange part 73 and back end surfaces 113*a* of the side plates 113 are in contact with each other and are welded to each other. Thus, the flange part 73 and the casing 111 are rigidly connected to each other in a watertight manner.

The positioning protrusions 74 each have a front end surface 74*a* that is a flat surface functioning as a positioning surface defining a distance between the connector 1 and the substrate 191 or the module side connector 101 mounted to the back surface of the substrate 191. Specifically, as illustrated in FIGS. 1A and 1B, in a state where the flange part 73 is attached to the casing 111, the front end surface 74*a* of the positioning protrusion 74 is in contact with the back surface of the substrate 191. The substrate 191 is fixed to and positioned with respect to the front end surface 74*a* with a distal end of a rod shaped member, such as a bolt or a rivet (not illustrated), inserted and fixed in a fixing hole 74*c* formed on the front end surface 74*a*.

The main body part 72 includes a back outer conductor containing cavity 72*a* that is open at the rear end of the main body part 72 and a front outer conductor containing cavity 72*b* that is open on the front surface of the flange part 73. The back outer conductor containing cavity 72*a* and the front outer conductor containing cavity 72*b* are each a cylindrical space that extends in the front and back direction and contain the connector 1. The main body part 72 includes an outer conductor holding part 75 that is positioned between the back outer conductor containing cavity 72*a* and the front outer conductor containing cavity 72*b*, and holds the outer conductor 61. The outer conductor holding part 75 protrudes to be more on the inner side in the radial direction of the main body part 72 than inner side surfaces of the back outer conductor containing cavity 72*a* and the front outer conductor containing cavity 72*b*. An outer conductor insertion hole 75*a* is formed at the center of the outer conductor holding part 75 and extends in the front and back direction. The back outer conductor containing cavity 72*a* and the front outer conductor containing cavity 72*b* are in communication with each other through the outer conductor insertion hole 75*a*. The outer conductor insertion hole 75*a*, into which the outer conductor 61 is inserted, is a cylindrical space with a smaller cross sectional area than the back outer conductor containing cavity 72*a* and the front outer conductor containing cavity 72*b*. The waterproof coaxial connector, connected to a distal end of an unillustrated cable, has at least a part of the distal end entering the back outer conductor containing cavity 72*a*, to be connected to the connector 1.

The connector 1 is attached and fixed to the back housing 71, by welding and fixing a tab 63, formed on the outer conductor 61, to a front surface 75*b* of the outer conductor holding part 75 in a state where the outer conductor 61 is inserted in the outer conductor insertion hole 75*a*, and then injecting a potting material 18 made of resin into the front outer conductor containing cavity 72*b*. Note that the potting material 18, the shape of which is illustrated in FIG. 3, is not actually formed as a single material as illustrated in FIG. 3, and is integrally molded with a member such as the outer conductor 61 and the front outer conductor containing cavity 72*b*. As illustrated in FIG. 2B, the contact arm 62, formed to protrude toward the front side from the front end of the outer conductor 61 in a state where the connector 1 is fixed to the back housing 71, at least has the front end positioned more on the front side than the front surface of the flange part 73. Thus, the contact arm 62 can enter the mating side fitting space 161*a* of the module side connector 101 in a state where the flange part 73 and the casing 111 are attached to each other as illustrated in FIGS. 1A and 1B.

Next, the configuration of the connector 1 will be described in detail. First of all, the configuration of the outer conductor 61 is described.

Figure 4A:
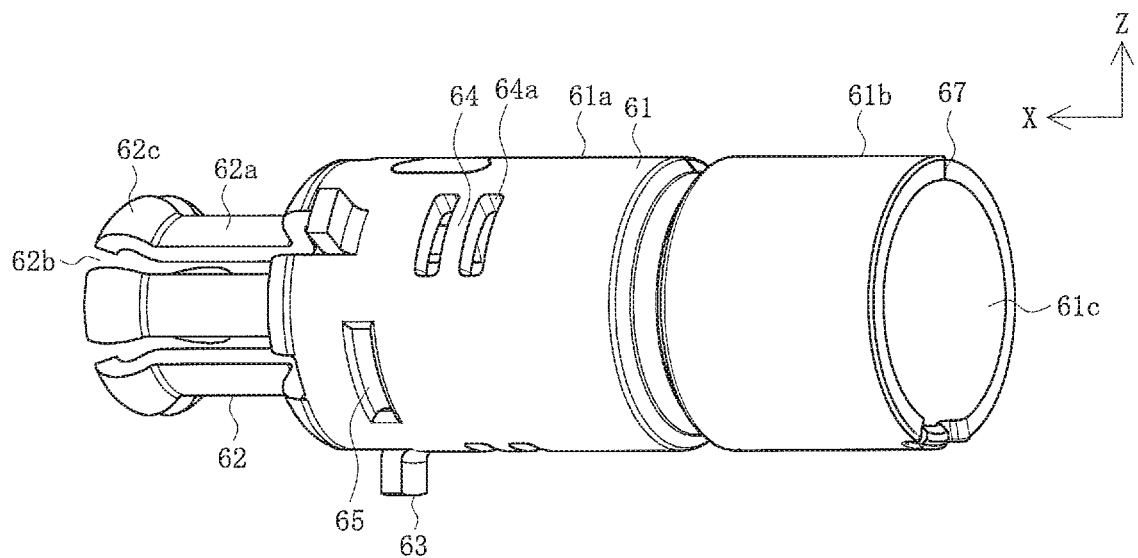
FIGS. 4A and 4B are perspective views of an outer conductor of the connector according to the present embodiment.
Figure 4B:
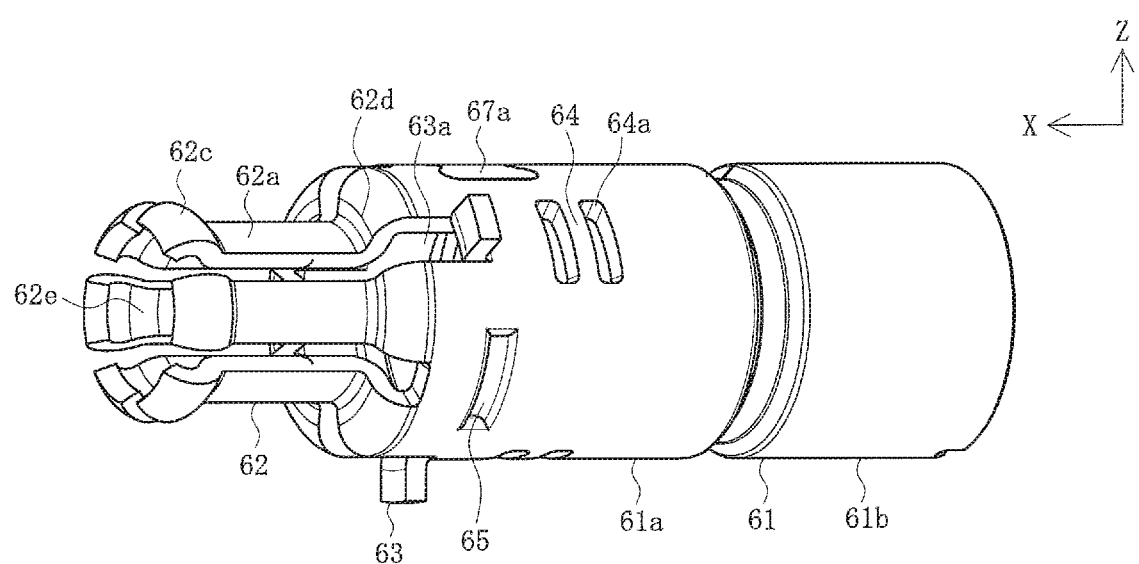
Figure 5A:
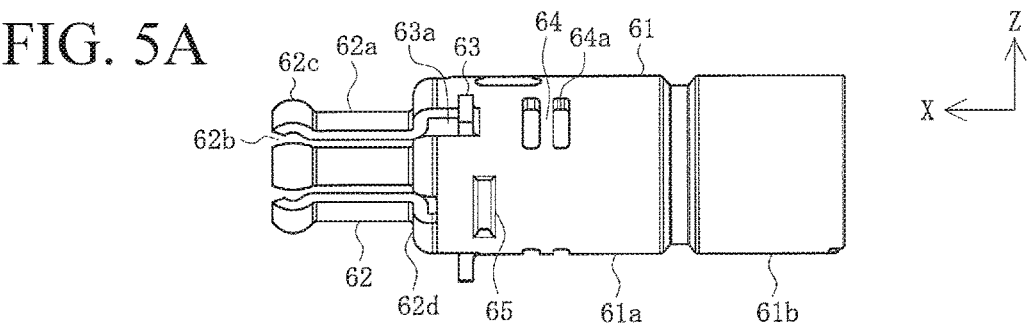
FIGS. 5A, 5B, 5C, 5D, 5E, and 5F are six-sided views of the outer conductor of the connector according to the present embodiment.
Figure 5B:
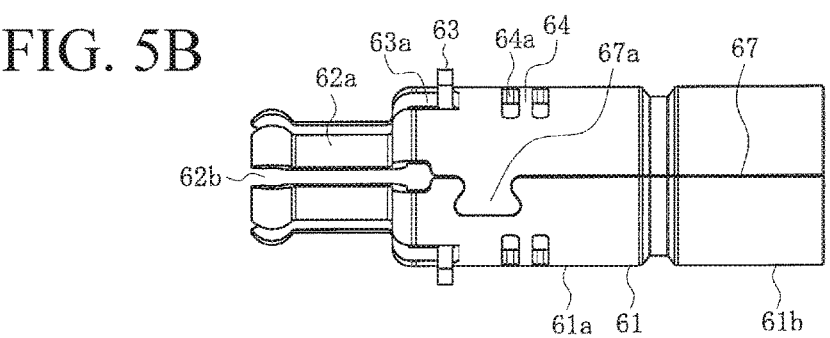
Figures 5C, 5D, 5E:
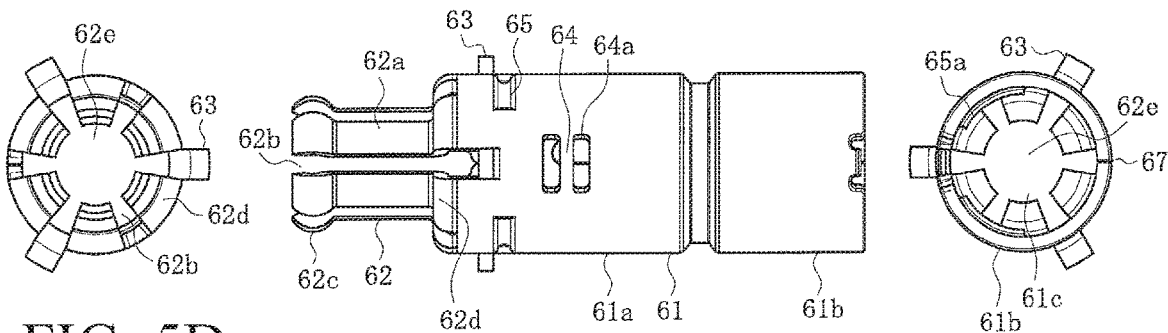
Figure 5F:
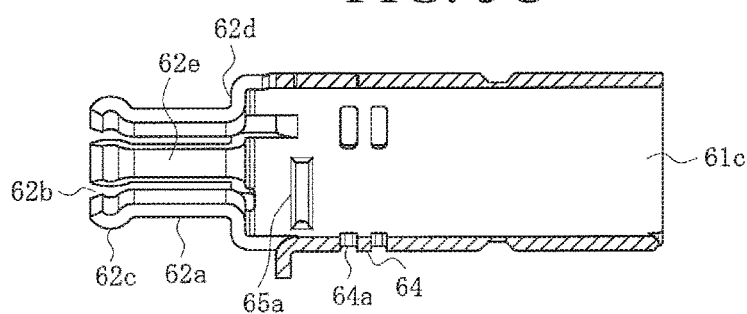

FIGS. 4A and 4B are perspective views of the outer conductor of the connector according to the present embodiment. FIGS. 5A through 5F are six-sided views of the outer conductor of the connector according to the present embodiment. FIG. 4A is a back view of the outer conductor and FIG. 4B is a front view of the outer conductor. FIG. 5A is a side view of the outer conductor, FIG. 5B is a side view of the outer conductor rotated by 45° in one direction about the center axis, FIG. 5C is a side view of the outer conductor rotated by 45° in the other direction about the center axis, FIG. 5D is a front view of the outer conductor as illustrated in FIG. 5C, FIG. 5E is a back view of the outer conductor as illustrated in FIG. 5C, and FIG. 5F is a side cross-sectional view of the outer conductor as illustrated in FIG. 5C.

In the present embodiment, the outer conductor 61 is a member integrally formed by bending a plate material having a predetermined outer shape obtained by punching a thin metal plate having a flat plate shape. Specifically, an appropriate portion of the flat plate having a predetermined outer shape is curved to form a cylindrical shape, and both ends facing each other are joined and bonded. Thus, the outer conductor 61 including a joint part 67 extending in the front and back direction as illustrated in FIG. 5B is formed. Both ends are caulked to be fixed to each other at a joint fixing part 67a.

The outer conductor 61 includes a front part 61a on the front side, a back part 61b on the back side, and a space part 61c formed inside the outer conductor 61. The space part 61c is a cylindrical space extending in the front and back direction. The contact arm 62 is integrally connected to the front end of the front part 61a. The contact arm 62 includes a flange part 62d, an arm member 62a, and a curved part 62c. The flange part 62d is a substantially flange shaped or annular plate member extending inward in the radial direction of the outer conductor 61 from the front end of the front part 61a. The arm member 62a extends toward the front side from an inner side end of the flange part 62d. The curved part 62c is connected to the front end of the arm member 62a and is curved to bulge toward the outer side in the radial direction of the outer conductor 61. The arm member 62a has a front side space part 62e on the inner side. The front side space part 62e is a space with a shape of a cylinder having a smaller diameter than the space part 61c, and has a front end open and has a back end connected to the space part 61c.

The flange part 62d, the arm member 62a, and the curved part 62c are each divided into a plurality of (six in the illustrated example) pieces along the circumference direction of the outer conductor 61 by a plurality of (six in the illustrated example) slits 62b extending in the front and back direction from the front end of the contact arm 62 to the front end of the front part 61a. With this configuration, each arm member 62a can be flexibly and elastically deformed, and thus can be deformed to conform with the shape of the inner side surface of the mating side outer conducting member 161 when the contact arm 62 is entering the mating side fitting space 161a to be maintained in a state of being in contact with the inner side surface.

At least one (three in the illustrated example) of the slits 62b includes an extended part 63a extending between the front end and the back end of the front part 61a. The extended part 63a is a slit formed as a result of forming the tab 63, extending outward in the radial direction of the outer conductor 61, by cutting and raising a part of a wall surface of the cylindrical front part 61a. The space part 61c and the front side space part 62e are in communication with the outer side of the outer circumference of the outer conductor 61, through the slit 62b and the extended part 63a.

At least one (two in the illustrated example) elongated recess part 65, extending in the circumference direction of the outer conductor 61, is formed on the front part 61a. The recess part 65 serves as a reservoir part for the potting material 18. The recess part 65 is formed to be positioned slightly more on the back side of the tab 63 in the front back direction (X axis direction). A protrusion part 65a is formed at a position of the inner wall surface of the space part 61c, corresponding to the recess part 65. The protrusion part 65a that comes into contact with the front end of an intermediate insulating member 11 described later, to function as a positioning part for positioning the intermediate insulating member 11 in the front and back direction.

At least one (three in the illustrated example) caulking part 64, functioning as a fixing part that fixes the intermediate insulating member 11, is formed on the front part 61a. The caulking part 64 is an elongated part that extends in the circumference direction of the outer conductor 61 while being sandwiched between through holes 64a formed through the wall surface of the front part 61a. The caulking part 64 is formed to be positioned on the back side of the recess part 65 and the protrusion part 65a in the front and back direction (X axis direction). The caulking part 64 deforms to protrude inward in the radial direction of the outer conductor 6, after the intermediate insulating member 11 has been contained in the space part 61c, so that the intermediate insulating member 11 is caulked to be fixed.

Next, a configuration of the inner conductor 51 and a configuration for attaching the inner conductor 51 to the outer conductor 61 will be described.

Figure 6C:
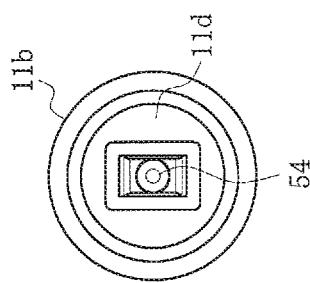
FIGS. 6A, 6B, 6C, and 6D are four-sided views of an inner conductor and an intermediate insulating member of the connector according to the present embodiment.
Figure 6A:
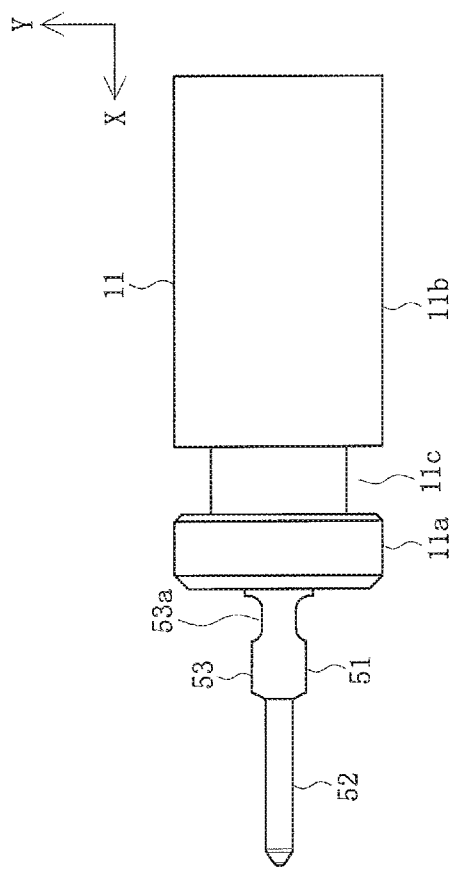
Figure 6B:
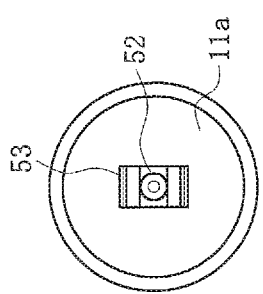
Figure 6D:
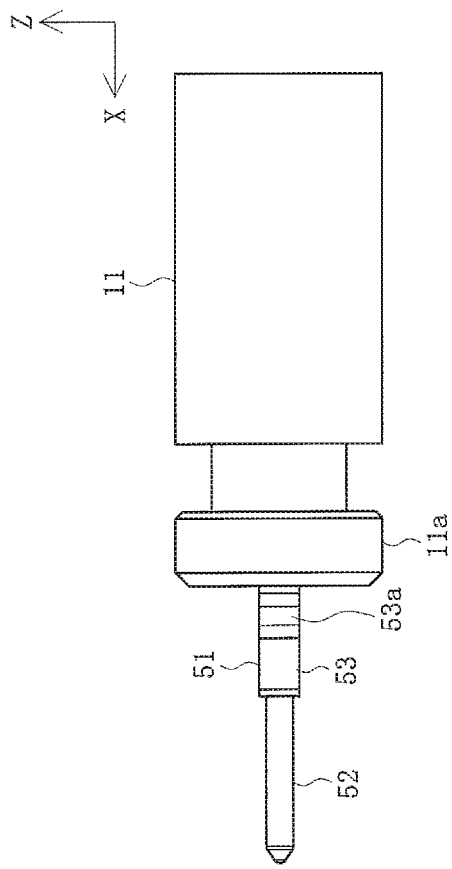
Figure 7A:
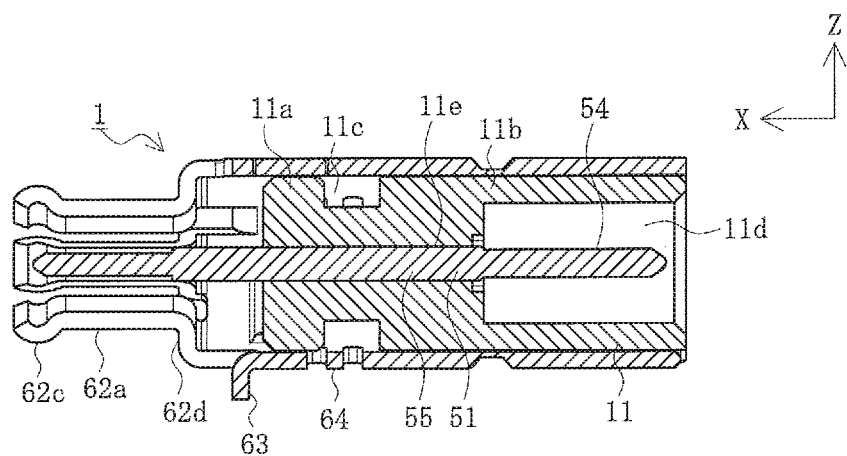
FIGS. 7A and 7B are cross-sectional views illustrating a state where the inner conductor of the connector according to the present embodiment is attached to the outer conductor via the intermediate insulating member.
Figure 7B:
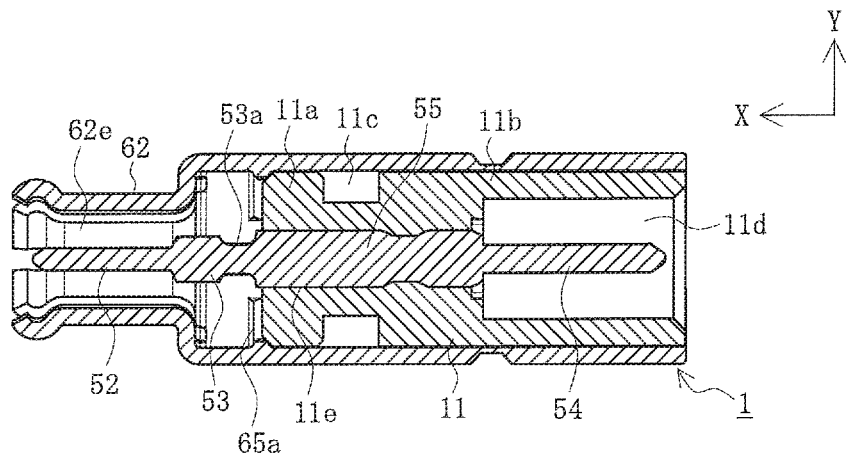

FIGS. 6A through 6D are four-sided views of the inner conductor and the intermediate insulating member of the connector according to the present embodiment. FIGS. 7A and 7B are cross-sectional views illustrating a state where the inner conductor of the connector according to the present embodiment is attached to the outer conductor via the intermediate insulating member. FIG. 6A is a side view of the inner conductor and the intermediate insulating member, FIG. 6B is a front view of the inner conductor and the intermediate insulating member as illustrated in FIG. 6A, FIG. 6C is a back view of the inner conductor and the intermediate insulating member as illustrated in FIG. 6A, and FIG. 6D is a side view of the inner conductor and the intermediate insulating member, as illustrated in FIG. 6A, rotated by 90° in one direction about the center axis. FIG. 7A is a side cross-sectional view of the inner conductor, the intermediate insulating member, and the outer conductor and FIG. 7B is a side view of the inner conductor, the intermediate insulating member, and the outer conductor, as illustrated in FIG. 7A, rotated by 90° in one direction about the center axis.

In the present embodiment, as illustrated in FIGS. 6A through 6D, the inner conductor 51 is integrated with the intermediate insulating member 11 that is a substantially cylindrical member extending in the front and back direction, through a method known as insert molding or over molding. Specifically, the inner conductor 51 is at least partially covered with the intermediate insulating member 11 made of insulating resin.

The inner conductor 51 includes an elongated main body part 55 extending in the front and back direction, a relay part 53 extending toward the front side from the front end of the main body part 55, a contact portion 52 extending toward the front side from the front end of the relay part 53, and a connection tail part 54 that extends toward the back side from the back end of the main body part 55. The main body part 55 has a rectangular cross-sectional shape, and is contained and held in the intermediate insulating member 11. The relay part 53 has a rectangular cross-sectional shape, and is more on the front side than the front end of the inner conductor 51 to be exposed. A recess part 53*a* functioning as an anchor part is formed on a side surface of the relay part 53. The contact part 52 has a rectangular cross-sectional shape, positioned in the front side space part 62*e* of the outer conductor 61, and comes into contact with the mating side inner conducting member 151 to establish conduction, when the connector 1 mates to the module side connector 101. The connection tail part 54 is exposed in the containing recess part 11*d* of the intermediate insulating member 11, and comes into contact with a terminal of a waterproof coaxial connector connected to a distal end of an unillustrated cable, when the waterproof coaxial connector is connected to the connector 1.

The intermediate insulating member 11 includes a front part 11*a* on the front side, a back part 11*b* on the back side, an engagement recess part 11*c* positioned between the front part 11*a* and the back part 11*b*, and a containing recess part 11*d* that is a cylindrical space formed in the back part 11*b* and extending in the front and back direction. The front part 11*a* and the back part 11*b* are cylindrical parts having substantially the same outer diameter. The engagement recess part 11*c* is a cylindrical part having an outer diameter smaller than those of the front part 11*a* and the back part 11*b*. In the figure, 11*e* denotes an inner conductor containing hole that contains the main body part 55 of the inner conductor 51.

The intermediate insulating member 11 integrated with the inner conductor 51 is inserted to the space part 61*c* of the outer conductor 61 from the back side of the outer conductor 61. The intermediate insulating member 11 is positioned with respect to the outer conductor 61 in the front and back direction, when the front end of the intermediate insulating member 11, that is, the front end of the front part 11*a* comes into contact with the protrusion part 65*a*. Thus, the intermediate insulating member 11 stops. Then, when an operator uses a tool or the like to make the caulking part 64 deform to protrude inward in the radial direction of the outer conductor 61, the caulking part 64 comes into contact with the back end of the front part 11*a*, and the intermediate insulating member 11 is caulked to be fixed, whereby the connector 1 is obtained. In this state, the positions of the back end of the intermediate insulating member 11 and the back end of the outer conductor 61 substantially match in the front and back direction as illustrated in FIGS. 7A and 7B, with the front end of the inner conductor 51, that is, the front end of the contact part 52 positioned more on the back side than the front end of the outer conductor 61, that is, the front end of the contact arm 62.

Next, a configuration for attaching the connector 1 to the back housing 71 is described.

Figure 8A:
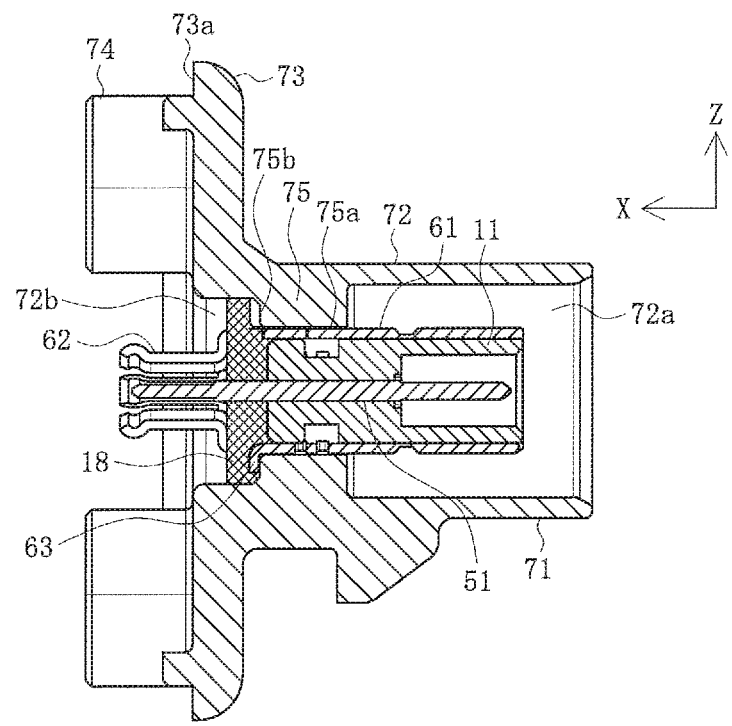
FIGS. 8A and 8B are cross-sectional views illustrating a state where the connector is attached to the back housing according to the present embodiment.
Figure 8B:
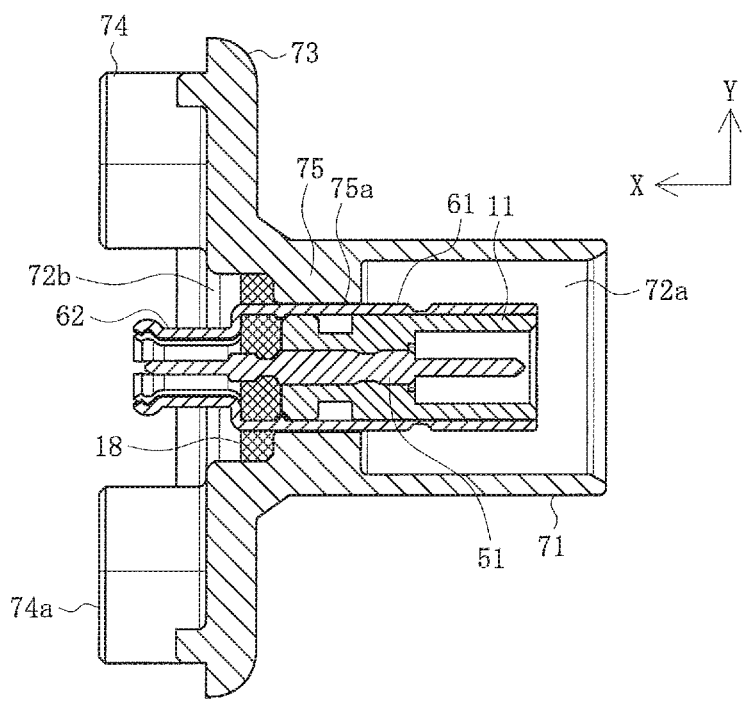
Figure 9A:
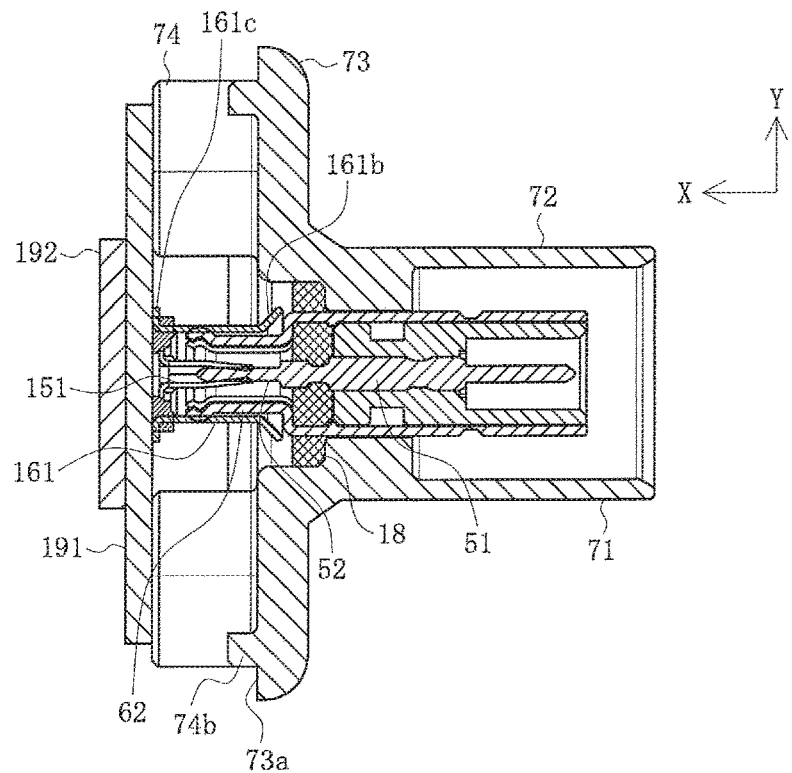
FIGS. 9A and 9B are cross-sectional views illustrating a state where the module is attached to the back housing according to the present embodiment.
Figure 9B:
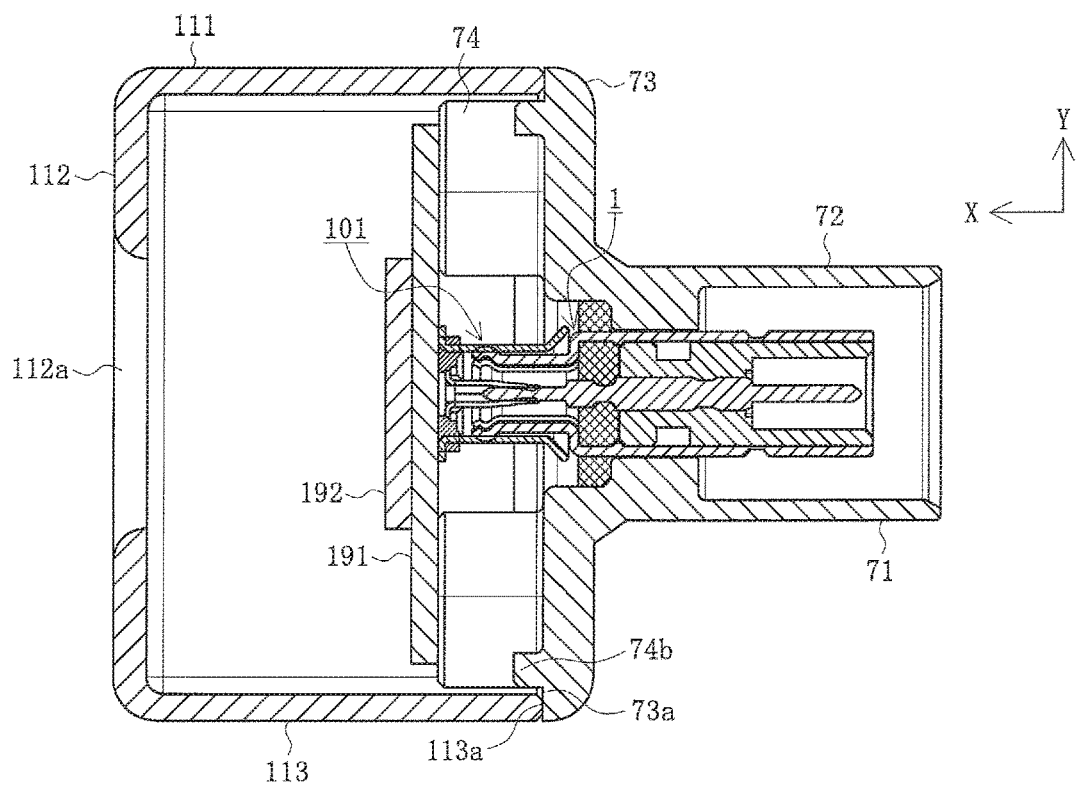
Figure 10:
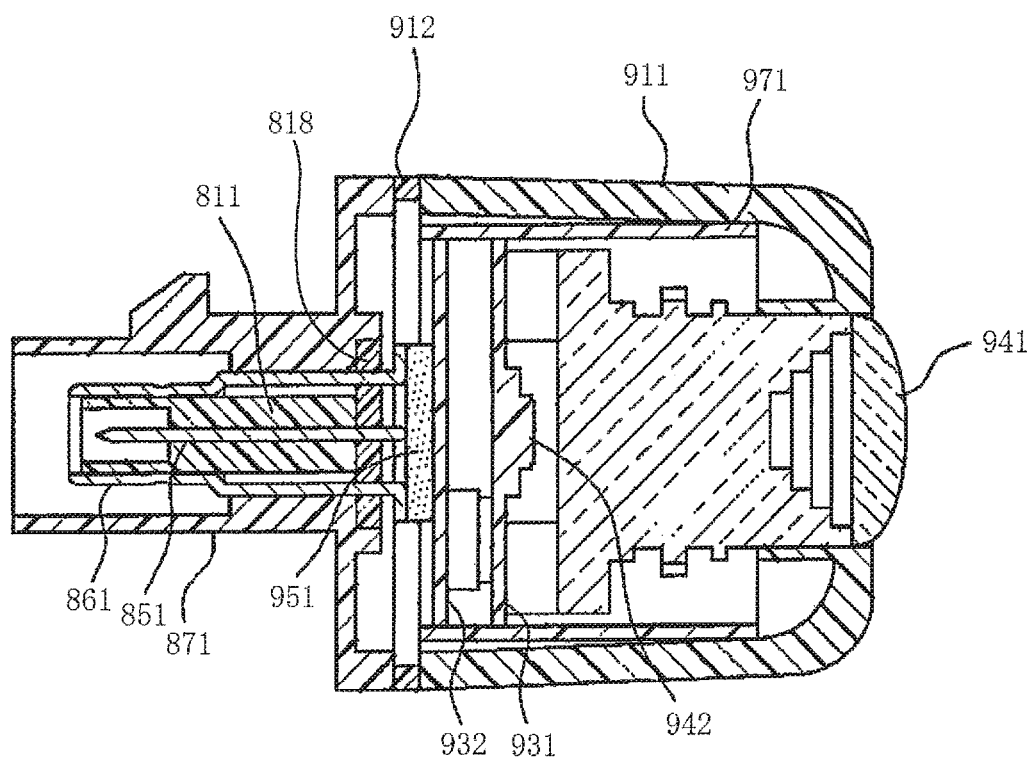
FIG. 10 is a cross-sectional view of a known connector.

FIGS. 8A and 8B are cross-sectional views illustrating a state where the connector is attached to the back housing according to the present embodiment. FIGS. 9A and 9B are cross-sectional views illustrating a state where the module is attached to the back housing according to the present embodiment. FIG. 8A is a side cross-sectional view of the connector and the back housing and FIG. 8B is a side view of the connector and the back housing, as illustrated in FIG. 8A, rotated by 90° in one direction about the center axis. FIG. 9A is a cross-sectional view illustrating a state where the substrate is attached to the back housing as illustrated in FIG. 8B and FIG. 9B is a cross-sectional view illustrating a state where the casing is further attached.

In the present embodiment, for example, the connector 1 is inserted into the outer conductor insertion hole 75*a* through the front outer conductor containing cavity 72*b* of the back housing 71 from the front side of the back housing 71, while being held by the hands or fingers of an operator. Specifically, the connector 1 is inserted into the outer conductor insertion hole 75*a* with the back end of the outer conductor 61 serving as the leading end. The connector 1 is positioned with respect to the back housing 71 in the front and back direction and the connector 1 stops when the back surface of the tab 63 comes into contact with the front surface 75*b* of the outer conductor holding part 75.

Next, preferably the operator uses a fiber laser to irradiate the front surface of the tab 63 with a laser beam, so that the tab 63 is welded and fixed to the outer conductor holding part 75. Thus, conduction is established between the outer conductor 61 and the back housing 71, whereby high shielding performance can be achieved when the outer conductor 61 is conductive with a ground line or the like. The protrusion part 65*a* that comes into contact with the front end of the intermediate insulating member 11 so that the intermediate insulating member 11 is positioned is formed to be positioned more on the back side than the back surface of the tab 63. Thus, the front end of the intermediate insulating member 11, that is, the front end of the front part 11*a* is at a position more on the back side than the back surface of the tab 63, that is, the front surface 75*b* of the outer conductor holding part 75. Thus, the intermediate insulating member 11 will not be burned by the laser beam scattering around the tab 63.

Next, preferably, the operator uses a resin potting device to inject the potting material 18 (epoxy resin for example) in a molten state into a portion in the front outer conductor containing cavity 72*b* close to the front surface 75*b* of the outer conductor holding part 75, so that the portion is filled with the material. Then, the potting material 18 in the molten state, which is fluid, flows into the outer conductor 61 through the slit 62*b*. As a result, not only a space defined by the outer surface of the front part 61*a* of the outer conductor 61, the inner surface of the front outer conductor containing cavity 72*b*, and the front surface 75*b* of the outer conductor holding part 75, but also a space, in the front part 61*a* of the outer conductor 61, that is more on the front side than the front end of the front part 11*a* of the intermediate insulating member 11 is filled with the material, as illustrated in FIGS. 8A and 8B. The potting material 18 is adhesive, and thus the filled and cured potting material 18 ensures the connector 1 to be fixed to the back housing 71, and watertight sealing between the front outer conductor containing cavity 72*b* and the back outer conductor containing cavity 72*a* is achieved. The recess part 65, formed on a portion of the outer circumference surface of the outer conductor 61 close to the tab 63, functions as a reservoir part for the potting material 18. Thus, the potting material 18 can be supplied from the recess part 65 even in a case where the potting material shrinks upon being cured. Thus, the potting material 18 can be prevented from cracking or peeling.

The recess part 53*a* serving as an anchor part is formed on the side surface of the relay part 53 of the inner conductor 51, whereby the potting material 18 filled in the recess part 53*a* provides what is known as an anchor effect so that the inner conductor 51 is anchored. Thus, the inner conductor 51 is also fixed to the back housing 71 with the potting material 18. The potting material 18 in a molten state that is fluid and thus further enters a slight gap between the inner circumference surface of the outer conductor insertion hole 75a and the outer circumference surface of the front part 61a of the outer conductor 61, a slight gap between the inner circumference surface of the front part 61a of the outer conductor 61 and the outer circumference of the front part 11a of the intermediate insulating member 11, and a slight gap between the inner circumference surface of the inner conductor containing hole 11e and the outer circumference surface of the main body part 55 of the inner conductor 51. Thus, the watertight sealing between the front outer conductor containing cavity 72b and the back outer conductor containing cavity 72a is more effectively achieved.

Next, the substrate 191, on which the module side connector 101 is mounted, is held with the hands or fingers of the operator, moved relatively toward the back side from the front side of the back housing 71 to be brought into contact with the front end surface 74a of the positioning protrusion 74, and then is fixed with an unillustrated rod shaped member such as a bolt or a rivet. As a result, the substrate 191 is attached to the housing 71, as illustrated in FIG. 9A. In this process, the connector 1 mates to the module side connector 101, the contact arm 62 of the outer conductor 61 enters the mating side fitting space 161a of the module side connector 101 to come into contact with the mating side outer conducting member 161 to be conductive therewith, and the contact part 52 of the inner conductor 51 comes into contact with the mating side inner conducting member 151 to be conductive therewith. In the example illustrated in the figure, the contact part 52 of the inner conductor 51 has a rod shape, and enters and comes into contact with the mating side inner conducting member 151 having a hollow shape with a distal end open. Alternatively, the mating side inner conducting member 151 may have a rod shape, and enter the contact part 52 of the inner conductor 51 having a hollow shape with a distal end open.

Next, the casing 111 is held by the hands or fingers of the operator, relatively moved toward the back side from the front side of the back housing 71 to bring the back end surface 113a of the side plate 113 and the front end circumference surface 73a of the flange part 73 into contact with each other, and then is welded to be fixed. Thus, the casing 111 is attached to the back housing 71 as illustrated in FIG. 9B.

As described above, in the present embodiment, the connector assembly includes the connector 1 and the back housing 71 to which the connector 1 is attached. The connector 1 includes the inner conductor 51 that is conductive, the intermediate insulating member 11 that contains the inner conductor 51, and the outer conductor 61 that is conductive and contains the intermediate insulating member 11. The back housing 71 includes the outer conductor holding part 75 provided with the outer conductor insertion hole 75a through which the outer conductor 61 is inserted and the front outer conductor containing cavity 72b that is formed on the front side of the outer conductor holding part 75 and has a larger cross-sectional area than the outer conductor insertion hole 75a. The connector 1 is fixed to the back housing 71 with the tab 63 that is integrally formed with the outer conductor 61 and is welded to the front surface 75b of the outer conductor holding part 75, and with the potting material 18 filled in the portion in the front outer conductor containing cavity 72b close to the front surface 75b of the outer conductor holding part 75.

Thus, the connector 1 is fixed to the back housing 71 with the tab 63 of the outer conductor 61 welded to the front surface 75b of the outer conductor holding part 75, and the front outer conductor containing cavity 72b filled with the potting material 18. Conduction and high water-tightness between the outer conductor 61 and the back housing 71 can be maintained. Furthermore, damaging and breaking due to external force can be prevented, whereby high shielding performance can be achieved, so that reliability can be improved.

The outer conductor 61 includes the plurality of slits 62b formed in a portion more on the front side than the front surface 75b of the outer conductor holding part 75. The potting materials 18 filled in portions on the inner and the outer sides of the outer conductor 61 are connected to each other through the slits 62b. This ensures the outer conductor 61 as well as the inner conductor 51 and the intermediate insulating member 11 therein to be fixed to the back housing 71, and ensures high water-tightness to be maintained.

The intermediate insulating member 11 has the front surface positioned more on the back side than the tab 63, and the potting material 18 further fills the portion in the outer conductor 61 more on the front side than the front surface of the intermediate insulating member 11. Thus, the intermediate insulating member 11 is guaranteed to be fixed by the potting material 18, without a risk of being burnt when the front surface 75b of the outer conductor holding part 75 and the tab 63 are welded to each other.

The outer conductor 61 is provided with the recess part 65 that functions as the reservoir part of the potting material 18. This ensures that the potting material 18 is sufficiently supplied, so that the potting material 18 can be prevented from cracking, peeling, or the like.

The inner conductor 51 has the recess part 53a, with which the potting material 18 is engaged, and which functions as the anchor part formed in the portion more on the front side than the front surface of the intermediate insulating member 11. Thus, the inner conductor 51 is fixed to the back housing 71.

The outer conductor 61 is a substantially cylindrical member made of a curved plate. Thus, a cost reduction can be achieved for the outer conductor 61.

Note that the disclosure of the present specification describes characteristics related to preferred and exemplary embodiments. Various other embodiments, modifications and variations within the scope and spirit of the claims appended hereto could naturally be conceived by persons skilled in the art by summarizing the disclosures of the present specification.

The present disclosure can be applied to connector assemblies.

The invention claimed is:

1. A connector assembly comprising:
   a connector, the connector having a terminal that is conductive, an intermediate insulating member that contains the terminal, and an outer conductor that is conductive and contains the intermediate insulating member; and
   a connector housing to which the connector is attached, the connector housing having an outer conductor holding part provided with an outer conductor insertion hole through which the outer conductor is inserted and a front outer conductor containing cavity that is formed on a front side of the outer conductor holding part and has a larger cross-sectional area than the outer conductor insertion hole,
   wherein the connector is fixed to the connector housing with a tab welded to a front surface of the outer conductor holding part, the tab being integrally formed with the outer conductor, and with a potting material filled in a portion in the front outer conductor containing cavity close to the front surface of the outer conductor holding part, and wherein the intermediate insulating member has a front surface positioned more on a back side than the tab, and the potting material further fills a portion in the outer conductor more on the front side than the front surface of the intermediate insulating member.

2. The connector assembly according to claim 1, wherein the outer conductor includes a plurality of slits formed in a portion more on a front side than the front surface of the outer conductor holding part, and pieces of the potting material filled in portions on inner and outer sides of the outer conductor are connected to each other through the slits.

3. The connector assembly according to claim 1, wherein the outer conductor is a substantially cylindrical member made of a curved plate.

4. A connector assembly comprising:
a connector, the connector having a terminal that is conductive, an intermediate insulating member that contains the terminal, and an outer conductor that is conductive and contains the intermediate insulating member; and
a connector housing to which the connector is attached, the connector housing having an outer conductor holding part provided with an outer conductor insertion hole through which the outer conductor is inserted and a front outer conductor containing cavity that is formed on a front side of the outer conductor holding part and has a larger cross-sectional area than the outer conductor insertion hole,
wherein the connector is fixed to the connector housing with a tab welded to a front surface of the outer conductor holding part, the tab being integrally formed with the outer conductor, and with a potting material filled in a portion in the front outer conductor containing cavity close to the front surface of the outer conductor holding part, and
wherein the outer conductor is provided with a recess part that functions as a reservoir part for the potting material.

5. The connector assembly according to claim 4, wherein the outer conductor includes a plurality of slits formed in a portion more on a front side than the front surface of the outer conductor holding part, and pieces of the potting material filled in portions on inner and outer sides of the outer conductor are connected to each other through the slits.

6. The connector assembly according to claim 4, wherein the outer conductor is a substantially cylindrical member made of a curved plate.

7. A connector assembly comprising:
a connector, the connector having a terminal that is conductive, an intermediate insulating member that contains the terminal, and an outer conductor that is conductive and contains the intermediate insulating member; and
a connector housing to which the connector is attached, the connector housing having an outer conductor holding part provided with an outer conductor insertion hole through which the outer conductor is inserted and a front outer conductor containing cavity that is formed on a front side of the outer conductor holding part and has a larger cross-sectional area than the outer conductor insertion hole,
wherein the connector is fixed to the connector housing with a tab welded to a front surface of the outer conductor holding part, the tab being integrally formed with the outer conductor, and with a potting material filled in a portion in the front outer conductor containing cavity close to the front surface of the outer conductor holding part, and
wherein an anchor part, with which the potting material is engaged, is formed in a portion of the terminal more on the front side than the front surface of the intermediate insulating member.

8. The connector assembly according to claim 7, wherein the outer conductor includes a plurality of slits formed in a portion more on a front side than the front surface of the outer conductor holding part, and pieces of the potting material filled in portions on inner and outer sides of the outer conductor are connected to each other through the slits.

9. The connector assembly according to claim 7, wherein the outer conductor is a substantially cylindrical member made of a curved plate.

* * * * *